United States Patent

[11] 3,587,372

| [72] | Inventor | Thomas B. Prew |
| | | Coppenhall, Stafford, England |
| [21] | Appl. No. | 810,667 |
| [22] | Filed | Mar. 26, 1969 |
| [45] | Patented | June 28, 1971 |
| [73] | Assignee | Stafford Tool & Die Company, Ltd. |
| | | Stafford, England |
| [32] | Priority | Mar. 29, 1968 |
| [33] | | Great Britain |
| [31] | | 15221/68 |

[54] METHOD AND APPARATUS FOR CUTTING A WORKPIECE
12 Claims, 3 Drawing Figs.

[52] U.S. Cl. ............................................. 83/16,
83/171, 83/527, 83/554
[51] Int. Cl. .......................................... B26d 7/10
[50] Field of Search ............................... 83/15, 16,
171, 527, 554, 633, 634, 8, 9; 156/515

[56] References Cited
UNITED STATES PATENTS

| 1,347,615 | 7/1920 | Buckminster | 83/554X |
| 1,938,678 | 12/1933 | Altvater | 83/554 |
| 2,102,660 | 12/1937 | Winkley | 83/554 |
| 2,470,561 | 5/1949 | Hunter | 83/554 |
| 3,099,596 | 7/1963 | Prew | 156/515X |

Primary Examiner—James M. Meister
Attorney—Sughrue, Rothwell, Mion, Zinn & MacPeak ABSTRACT: A press machine with platens moved relatively to one another by two piston and cylinder units of different capacity acting successively. The operative positions of the units are adjustable relatively and in unison. A form tool is placed between the platens to engage a workpiece and heating means is connected to the form tool to locally heat the workpiece. In use, the form tool is driven into the workpiece to a predetermined depth by one of the units with simultaneous operation of the heating means. Thereafter a final movement of the tool at increased force is effected by the other unit to complete the penetration of the workpiece.

METHOD AND APPARATUS FOR CUTTING A WORKPIECE

BACKGROUND OF THE INVENTION

As is known the production of certain articles such as footwear can involve the simultaneous welding and embossing and the subsequent cutting of layers of material, either leather or synthetics, into pieces having a shape dictated by the shape of a cutter. This process can be performed by the use of a press machine into which is incorporated a form tool for treating the sheet material and imparting to it the desired shape and pattern, and heating means for welding the material and aiding the form tool in cutting and embossing the sheet material.

Machines of this nature are known and generally use a high frequency alternating current generator as heating means. The current from the generator serves to heat the workpiece in the zone of the working edge of the form tool. Such a machine has upper and lower platens which are moved together to cause the form tool arranged between the two platens to be impressed into the workpiece to impart the desired shape and pattern thereto. The high frequency alternating current generator is controlled and operated by the movement of the platens so as to perform a predetermined heating cycle synchronized with the movements of the platens and the action of form tool. The usual operating sequence of a typical machine is as follows:

a. The generator is initially inoperative and the workpiece in the form of a single sheet of material or several layers of sheet material is arranged between the lower platen and the upper platen. The form tool is disposed to contact the sheet material as the upper platen is moved towards the lower platen and the form tool is made to contact the workpiece.

b. At the moment when the form tool contacts the workpiece, or at some other predetermined time, the high frequency generator is rendered operative and serves to apply a high frequency alternating current between the form tool and the frame of the machine including the lower platen. The current causes localized heating in the region of the form tool as simultaneously the form tool is pressed into the material.

c. When the cutter part of the form tool has passed almost entirely through the workpiece the generator is switched off otherwise the generator would be subjected to a short circuit when any part of the cutter form contacts the lower platen.

It is frequently desireable to allow a cooling period at this stage to allow the plasticized material to set before final cutting is attempted.

d. Finally the upper platen is moved downwardly, usually with increased force, to make the final cut through the workpiece.

The various adjustments necessary to enable the machine to perform the operating sequence correctly are critical. The correct adjustment of the machine can be rather complicated and it is difficult to maintain the machine in its correctly adjusted state. Moreover, as an added factor the height of the cutter part of the form tool can vary over time and various types of form cutter may be used with one press.

A general object of the present invention is to provide an improved machine which can carry out the functions hereinbefore specified.

A further object of the invention is to provide a machine which is constructed so that the control and adjustment of its operation can be simply and reliably effected.

SUMMARY OF THE INVENTION

In a press machine having a frame, upper and lower platens mounted on the frame for movement relative to one another the invention comprises means for moving the platens relative to one another in the form of two piston and cylinder units, the cylinders of said units having different capacities, a pressure medium source for supplying pressure medium to said units control means for selectively controlling the supply of pressure medium to said units and means for adjusting the operative positions of said units.

A form tool is mounted between the platens to engage and treat a workpiece when the platens are moved relatively towards one another and heating means can be operably connected to said form tool to effect selective local heating of the workpiece. Further according to the invention the adjustment means acts to selectively alter the operative positions of the units in unison or relative to one another.

In operation of the preferred embodiment of the invention a first piston and cylinder unit moves the platens together until the cutter form of the form tool has just contacted the workpiece. The heating means is operated to heat the workpiece in the zone around the cutter form to effectively plasticize the workpiece and the form tool is impressed into the plasticized workpiece to emboss and/or weld the latter. The generator is preferably automatically switched off before the cutter form has completely penetrated the workpiece and the second piston and cylinder unit is actuated, after a suitable dwell time if necessary, to cause the cutter form to complete the final cutting stroke.

Various other aspects of the present invention will become more apparent from a consideration of the constructional embodiment thereof.

BRIEF DESCRIPTION OF DRAWINGS

A constructional embodiment of the present invention will now be described by way of example only with reference to the accompanying drawing wherein.

DESCRIPTION OF PREFERRED EMBODIMENT

Figure 1:
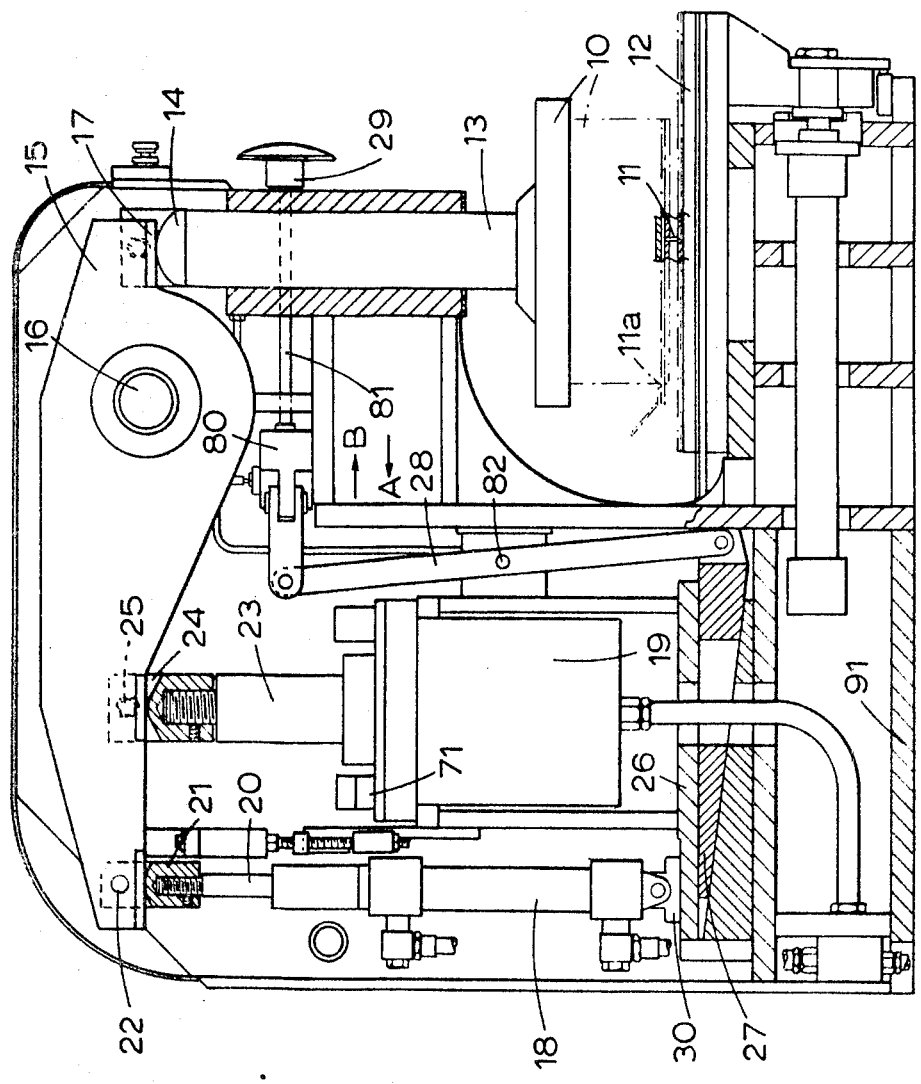
FIG. 1 is a side elevation of a machine made in accordance with the invention.

As shown in the drawings, the machine has a main body or frame 91 with an upper platen 10 and a lower platen 12. A form tool 11, of which only one cutter form is shown for the sake of clarity can either be attached to the platen 10 or free standing thereon as shown in FIG. 1. The form tool 11 has a cutter blade or form to effect cutting and possibly additional implements to impart a pattern to a workpiece. In the example, the form tool 11 is mounted on a backing plate 11a. The lower platen 12 preferably has a detachable backing member which is made from a relatively soft metallic material such as brass for reasons which will be hereinafter mentioned.

The upper platen 10 is attached to a stem 13 which has a hardened stop member 14 at the upper end thereof. A rocker arm 15 is carried by the frame 91 and is disposed in the upper part of the frame of the machine. The arm 15 is pivotable about an axis 16. The arm 15 has an abutment face 17 for engagement with the stop member 14. The arm 15 can be moved by means of a first pressure medium operated piston and cylinder unit 19. The unit 19 is larger in capacity than the unit 18. The unit 18 has a ram 20 which is coupled to the end of the arm 15 remote from the stem 13. To this end the ram 20 is connected to a thrust member 21 which carries a pin 22 engaging in an elongated slot in the arm 15. The unit 19 has a ram 23 which is coupled to the arm 15 at a position nearer to the pivotal axis 16 of the arm 15. In a similar manner to the unit 18, the ram 23 is connected to a thrust member 24 which carries a pin 25 engaging in a bore in the arm 15. In order to avoid backlash and to mitigate the effect of wear at the junction between the ram 20 and the arm 15 on the one hand and between the stop member 14 and the arm on the other hand it is preferable to provide resilient means at these junctions.

The cylinders of the units 18, 19 are attached to a movable block 26. A wedge element 27 contacts the lower face of the block 26 and the block 26 can be moved in a vertical direction upon displacement of the wedge element 27 in a direction horizontally of the machine. The wedge element 27 is displaceably mounted in the frame of the machine and is moved by means of a mechanical linkage 28. The linkage 28 is arranged to be manually adjusted by means of a control member 29. In the illustrated embodiment the member 29 is rotated to effect movement of a block 80 in the direction of arrow A or B. This can be accomplished by a screw-threaded engagement between a rod 81 connected to the member 29 and the block 80. As can be appreciated movement of the block 80 causes the linkage 28 connected thereto to pivot about an axis 82 to displace the wedge element 27. Means such as one or more further piston and cylinder units is preferably provided to support the weight of the block 26 when adjustment is being effected. This means is disabled at all other times so that only when adjustment is desired is the weight of the block 26 supported.

Figure 2:
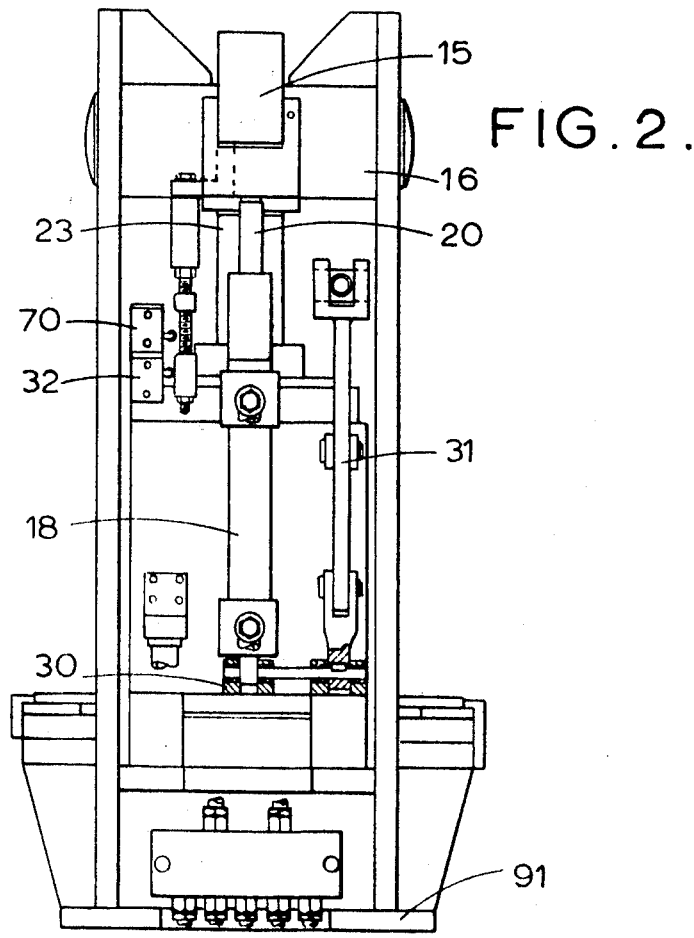
FIG. 2 is an end elevation of the machine shown in FIG. 1.

The cylinder of the unit 18 is connected to the block 26 through an eccentric bearing 30 whereas the cylinder of the unit 19 is rigidly connected to the block 26. The eccentric bearing 30 is movable to move the cylinder of the unit 18 relative to the cylinder of the unit 19. To this end the eccentric bearing 30 is operably associated with a further mechanical linkage 31 (FIG. 2) which can be operated in a similar manner to that of the linkage 28, and a further control member (not shown) is provided for effecting movement of the linkage 31 and thereby adjustment of the bearing 30. Each unit 18, 19 is charged from a common pressure medium source and in use are subjected to pressures in the order of 2,000 p.s.i.

Heating means in the form of a separate high frequency generator 90 (not shown in detail) can be attached to one side part of the frame of the machine or disposed remote from the machine. The operation of the generator 90 is controlled by means one of two fixed microswitches 32 which are so arranged as to be actuated by the displacement of the ram 20 of the unit 18. The output of the generator 90 is applied between the form tool 11 and the lower platen 12 electrically connected to the frame of the machine. The generator 90 also has a secondary output the function of which is described hereinafter. The charging of the cylinder of the unit 19 with pressure medium is made dependent upon the operation of the generator 90 as will be hereinafter described. The generator 90 is switched on when the microswitch 32 associated therewith, say the lower one 32' is actuated by a part connected to the ram 20 of the unit 18. The generator 90 is switched off by an internal timing device which deactivates the generator 90 after the duration of a predetermined time from its initial activation by the lower microswitch 32. The timing device is preferably adjusted to switch the generator off after a time selected from a range. The other microswitch 32, in this example the upper one, serves to effect the return of the upper platen 10 after the desired treatment of the workpiece has taken place. The upper microswitch 32 is again actuated by the movement of the ram 20. The operation of the machine is as follows:

In general, when the machine is initially set up, the backing member on the lower platen 12 is lightly scored by the cutter form of the form tool 11 so that it has a groove therein which receives the cutter form during subsequent use of the machine. Hence it is desirable to make the base 12 of a relatively soft material, such a brass so that it can be easily scored. Thereafter, a workpiece in the form of one or more layers of sheet material is placed onto the backing member and treated by the form tool 11 upon downward movement of the upper platen 10. The operation of the generator 90 is synchronized with the movement of the platen 10 and in a final cutting stroke the generator is switched off and a lowermost continuous part of the workpiece is pinched in the groove lightly marked in the base 12. The lower part of the workpiece is thus pinched in the groove by the cutter form to effect final cutting.

Figure 3:
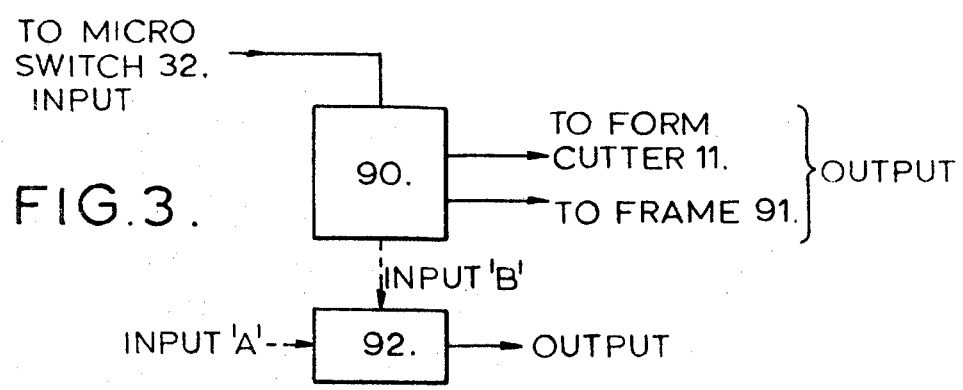
FIG. 3 is a block diagram of the heating means and the means for setting a dwell time as used with the machine of FIGS. 1 and 2.

As mentioned, the workpiece comprises a single layer or several layers of sheet material and preferably includes at least one thermoplastic substance. Assuming the scoring operation is carried out the workpiece is placed into the backing member of the platen 12 and the generator 90 is off. Providing certain safety requirements are met, which are outside the scope of the present invention, the charging of the cylinder of the unit 18 can now be effected. The application of pressure medium to the unit 18 causes the ram 20 to urge the corresponding end of the arm 15 in an upward direction. As the arm 15 pivots about the axis the abutment face 17 exerts pressure on the stop member 14 of the stem 13 which consequently cause the upper platen 10 to descend. This continues until the cutter form of the form tool 11 contacts the uppermost surface of the workpiece and begins to penetrate therein. The lowermost microswitch 32' is arranged in such a position that it is actuated by the part of the ram 20 to operate the generator 90 when the cutter form of the form tool 11 just contacts the workpiece before penetration takes place. Alternatively, depending upon the prevailing circumstances it may be more desirable to cause the generator 90 to be activated just before or just after the cutter form of the form tool contacts the workpiece. Consequently, when this position is reached and the switch 32 is operated the generator 90 will be switched on to apply an electric field between the form tool 11 and the frame of the machine to thereby heat and plasticize the workpiece locally in a zone around the cutter form while the cutter form continues to descend through the workpiece. The generator 90 is controlled by the internal timing device and thus a predetermined heating cycle is achieved. The automatic switching off of the generator 90 by the timing device is arranged to occur when the cutter form has penetrated by a certain distance into the workpiece, typically about 0.005 inch from cutting completely through the workpiece. The time set by the timing device can be adjusted to ensure that for different thicknesses of workpiece there is no danger that the form tool 11 could contact the backing member before the generator 90 has been switched off. In most cases the generator 90 is switched off by the timing device to allow a dwell time to take place. However it should be noted that in some cases, such as where the workpiece is made from leather, the dwell time may not be necessary or desirable. The dwell time ensures that the plasticized material of the workpiece has time to set around the cutter form before final cutting takes place. The dwell time is set by a further timing device (92 FIG. 3) which is activated by the first-mentioned timing device via the secondary output of the generator 90 (input A) or which is activated independently thereof (input B). In the second case for example the input B can be fed from the microswitch 32 so that both timing devices commence operation at the same time. At the end of the dwell time the device 92 generates an output which causes the cylinder of the unit 19 to be charged with pressure medium and this consequently causes the ram 23 to now exert a force on the arm 15. Since the cylinder of the unit 19 is larger than that of unit 18 the force will be greater than the force exerted by the extension of the ram 20 of unit 18. This has the effect of delivering a sharp force to the form tool 11 in order to complete the final cut through the workpiece. Since the ram 20 of the unit 18 is located in an elongated slot of the arm 15 the corresponding end of the arm 15 can move relative to the ram 20 when the ram 23 exerts its force on the arm 15 thereby preventing damage to the unit 18. Since the generator 90 is switched off there is no danger of short circuiting the output of the generator. The final cutting operation causes actuation of the microswitches 71 by the piston of the unit 19 to being about the return of the upper platen 10 to its original position and the subsequently deactivates the machine. The microswitch 70 is actuated when the platen 10 is returned to its uppermost position and this can provide an indication useful for other means such as feeding means outside the scope of this invention. Only if a safety switch is operated can the next cutting cycle be commenced.

The entire operating sequence of the press is composed of a number of steps which are dependent upon one another. The advantage of having the steps dependent upon one another is that in the case of a fault the operation of the machine is automatically halted.

To control the final cutting action effected by the unit 19 the wedge member 27 can be manually adjusted through the control member 29 to move the units 18, 19 en bloc. The relative positions of the units 18, 19 can be adjusted through the linkage 31 to vary the distance by which the cutter form of the tool fails to meet the backing member of the lower platen 12 under the action of the unit 18, typically 0.005 inch. Thus the adjustment of the machine to suit various thicknesses of material and types of material and to suit different cutter form depths can be effected by the adjustments mentioned. The movement of the control members associated with the linkages 28, 31 can be suitably calibrated to make adjustment even simpler.

A notable advantage of the machine is derived from the way in which the force is applied to move the platen 10. In known machines a force is applied from a prime mover along a path extending centrally of the upper platen. A disadvantage of this arrangement is that yaw can occur between the faces of the frame of the machine aligned with the platens. In contrast the machine of this invention inhibits the yaw effect because the resultant force path is confined to the rigid part of the frame.

I claim:

1. In a press machine having a frame, upper and lower platens mounted on the frame for movement relative to one another the improvement comprising means for moving the platens relative to one another in the form of two piston and cylinder units, the cylinders of said units having different capacities, a pressure medium source for supplying pressure medium to said units, control means for selectively controlling the supply of pressure medium to said units and means for adjusting the operative positions of said units.

2. A machine according to claim 1 wherein the control means is adapted to cause the pressure medium to be applied to the units successively.

3. A machine according to claim 1 wherein the adjustment means acts to selectively alter the operative positions of the units in unison and relative to one another.

4. A machine according to claim 3 wherein a block is rigidly attached to the cylinder of one of the units, and an eccentric bearing serves to connect the cylinder of the other of the units to said block and wherein the adjustment means including a wedge element displaceable to move the block and the cylinders of the units in unison a first control member for moving said wedge element and a further control member connected to said eccentric bearing and operable to effect independent movement of the cylinder of said other unit.

5. A machine according to claim 1 wherein a rocker arm is pivotally mounted in the frame and has one end operably connected to the upper platen to effect movement thereof, the units having rams operably connected to the other end of the rocker arm the ram of a first unit of said two units being operably connected to the arm at a greater distance from the pivotal axis thereof than the ram of the second unit.

6. A machine according to claim 5, wherein said first unit has a cylinder of less capacity of that of the second unit and the control means causes pressure medium to be supplied initially to the first unit to effect initial displacement of the upper platen in a working cycle, and then to the second unit to effect final displacement of the upper platen in said working cycle.

7. The combination comprising a machine according to claim 1, a form tool mounted between the platens to engage and treat a workpiece when the platens are moved relatively towards one another and heating means operably connected to said form tool to effect selective local heating of the workpiece.

8. The combination according to claim 7 wherein the heating means is in the form of a high frequency alternating current generator.

9. The combination according to claim 8, wherein the generator is activated by a switch member controlled by the operative movement of one of said units and the generator has a timing device which deactivates it after the expiry of a predetermined heating cycle.

10. The combination according to claim 8 further comprising a timing device for setting a dwell time between the heating cycle and final cutting of the workpiece.

11. A method of cutting a workpiece in a press machine comprising the steps of placing the workpiece between the platens of the machine for engagement by a form tool, relatively moving the platens with a first piston and cylinder unit to cause the form tool to penetrate the workpiece to a predetermined depth, relatively moving the platens at increased force with a second piston and cylinder unit to cause the form tool to cut through the workpiece, and applying heat to the workpiece locally of the form tool from the time when the form tool just contacts the workpiece to the time when the form tool penetrates the workpiece to said predetermined depth.

12. A method of cutting a workpiece in a press machine comprising the steps of placing the workpiece between the platens of the machine for engagement by a form tool, relatively moving the platens with a first piston and cylinder unit to cause the form tool to penetrate the workpiece to a predetermined depth, relatively moving the platens at increased force with a second piston and cylinder unit to cause the form tool to cut through the workpiece, and using a dwell time between the time when the form tool reaches said predetermined depth and the movement of the platens by the second unit.